(12) United States Patent
Moscinski et al.

(10) Patent No.: US 10,502,194 B2
(45) Date of Patent: Dec. 10, 2019

(54) WIND TURBINE BEARINGS

(71) Applicant: General Electric Company, Schenectady, NY (US)

(72) Inventors: Michael Colan Moscinski, Glenville, NY (US); Norman Arnold Turnquist, Carlisle, NY (US); Daniel Jason Erno, Clifton Park, NY (US); Fulton Jose Lopez, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 792 days.

(21) Appl. No.: 15/166,565

(22) Filed: May 27, 2016

(65) Prior Publication Data
US 2017/0342967 A1 Nov. 30, 2017

(51) Int. Cl.
*F03D 80/70* (2016.01)
*F03D 9/25* (2016.01)
(Continued)

(52) U.S. Cl.
CPC .......... *F03D 80/70* (2016.05); *F03D 1/0658* (2013.01); *F03D 7/0224* (2013.01); *F03D 9/25* (2016.05)

(58) Field of Classification Search
CPC ...... F03D 1/065; F03D 1/0658; F03D 7/0224; F03D 9/25; F03D 80/70; F16C 19/546;
(Continued)

(56) References Cited

U.S. PATENT DOCUMENTS 7,381,029 B2 6/2008 Moroz
7,939,961 B1 5/2011 Bonnet
(Continued)

FOREIGN PATENT DOCUMENTS

EP 2 334 933 A2 6/2011
WO 03098034 A1 11/2003
(Continued)

OTHER PUBLICATIONS

Long et al., "Contact Stress and Deformation of Blade Bearing in Wind Turbine", Measuring Technology and Mechatronics Automation (ICMTMA), 2010 International Conference on, vol. 1, pp. 833-836, Mar. 13-14, 2010.
(Continued)

*Primary Examiner* — David E Sosnowski
*Assistant Examiner* — Sang K Kim
(74) *Attorney, Agent, or Firm* — Mary Louise Stanford

(57) ABSTRACT

In one aspect, a dual pitch bearing configuration for coupling a rotor blade to a hub of a wind turbine. The dual pitch bearing configuration including a first pitch bearing and at least one additional pitch bearing. The first pitch bearing and the and at least one additional pitch bearing are coupled to opposed surfaces of a static shaft. The at least one additional pitch bearing is disposed radially a distance $L_R$ and axially a distance $L_A$ from the first pitch bearing along the static shaft. The dual pitch bearing is disposed radially within a blade root of the rotor blade. The dual pitch bearing configuration minimizing moment loading on the first pitch bearing and the at least one additional pitch bearing. A wind turbine including the dual pitch bearing configuration is further disclosed.

21 Claims, 6 Drawing Sheets

(51) Int. Cl.
*F03D 1/06* (2006.01)
*F03D 7/02* (2006.01)

(58) Field of Classification Search
CPC .. F16C 35/07; F16C 2360/31; F05B 2260/79;
Y02E 10/721; Y02E 10/722
See application file for complete search history.

(56) References Cited

U.S. PATENT DOCUMENTS

| | | | |
|---|---|---|---|
| 8,262,360 B2* | 9/2012 | Whiley | F03D 1/0658 |
| | | | 416/219 R |
| 8,459,946 B2* | 6/2013 | Yoshida | F03D 7/0224 |
| | | | 416/153 |
| 8,981,587 B2 | 3/2015 | Castell Martinez et al. | |
| 2003/0075929 A1 | 4/2003 | Weitkamp | |
| 2003/0116970 A1* | 6/2003 | Weitkamp | F03D 7/0224 |
| | | | 290/44 |
| 2009/0148291 A1 | 6/2009 | Gerber et al. | |
| 2015/0010403 A1 | 1/2015 | Wilson et al. | |

FOREIGN PATENT DOCUMENTS

| | | |
|---|---|---|
| WO | 2013104779 A1 | 7/2013 |
| WO | 2015/022310 A1 | 2/2015 |
| WO | 2015128426 A1 | 9/2015 |

OTHER PUBLICATIONS

Extended European Search Report and Opinion issued in connection with corresponding EP Application No. 17172623.5 dated Oct. 20, 2017.

* cited by examiner

WIND TURBINE BEARINGS

BACKGROUND

The disclosure relates generally to wind turbines and, more particularly, to improved bearing configurations for a wind turbine.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a bearing, also referred to as a pitch bearing, disposed at the interface between the cantilevered rotor blade and the wind turbine hub. Typically, conventional pitch bearings include an inner ring, an outer ring, and two rows of balls or rollers, also referred to as rolling elements, concentrically disposed within separate raceways defined between inner and outer bearing races, with each rolling element being configured to contact its corresponding raceway at four separate contact points. This type of bearing is commonly referred to as a four-point bearing. In known bearing configurations, the predominant load applied to the bearing by the cantilevered blade is in the form of a moment that pries the bearing inner ring out of the outer ring. Typically, any bearing that is expected to do the job of a pitch bearing should have maximum capacity for moment rather than being designed to handle pure axial or radial load. Inside a bearing, this moment translates into forces on the rolling elements that act mainly parallel to the axis of the blade.

Unlike regular ball bearings, normal operation of pitch bearings in wind turbines involves oscillations about a set pitch angle as opposed to continuous rotation at high speed in one direction. Under ideal loading conditions, the loads transmitted through the pitch bearing are distributed evenly over all of the rolling elements. However, due to dynamic loading on the pitch bearing and the difference in stiffness between the hub and the rotor blade, only a percentage of the rolling elements actually carry the loads during operation of the wind turbine. As a result, the stresses within such load-carrying rolling elements tend to exceed the design tolerances for the pitch bearing, leading to damage and potential failure of the pitch bearing. Moreover, under dynamic loads, the rolling elements of conventional pitch bearings tend to run up and over the edges of the raceways, resulting in the rolling elements having reduced contact areas with the raceways. This leads to an additional increase in the stresses within the rolling elements, thereby further increasing the potential for damage to the pitch bearing components. In addition, the large bending and shear forces created result in unwanted deflections of the bearing races (potato chip). Similar issues may be present in conventional yaw bearings for wind turbines.

Thus, it is highly desirable to provide a wind turbine blade bearing configuration that addresses one or more of the issues described above.

BRIEF DESCRIPTION

These and other shortcomings of the prior art are addressed by the present disclosure, which includes a dual pitch bearing configuration that allows for control of rotational displacement of a rotor blade of a wind turbine to enable as much wind energy as possible to be captured.

Briefly, one aspect of the present disclosure resides in a dual pitch bearing configuration for a rotor blade of a wind turbine. The dual pitch bearing configuration including a first pitch bearing and at least one additional pitch bearing. The first pitch bearing including an inner bearing race, an outer bearing race and a plurality of rolling elements disposed between the inner bearing race and the outer bearing race. The at least one additional pitch bearing including an inner bearing race, an outer bearing race and a plurality of rolling elements disposed between the inner bearing race and the outer bearing race. The first pitch bearing and the second pitch bearing are coupled to opposed surfaces of a static shaft. The at least one additional pitch bearing is disposed radially a distance $L_R$ from the first pitch bearing and axially a distance $L_A$ from the first pitch bearing along the static shaft, thereby minimizing moment loading on the first pitch bearing and the at least one additional pitch bearing.

Another aspect of the disclosure resides in a dual pitch bearing configuration for coupling a rotor blade to a hub of a wind turbine. The dual pitch bearing configuration including a static shaft, a first pitch bearing and a second pitch bearing. The static shaft including a wall thickness defining an interior surface and an exterior surface. The static shaft extending axially from the hub. The first pitch bearing coupled to an interior surface of the static shaft. The first pitch bearing including an inner bearing race, an outer bearing race and a plurality of rolling elements disposed between the inner bearing race and the outer bearing race. The second pitch bearing coupled to an exterior surface of the static shaft. The second pitch bearing including an inner bearing race, an outer bearing race and a plurality of rolling elements disposed between the inner bearing race and the outer bearing race. The second pitch bearing disposed radially a distance $L_R$ from the first pitch bearing, where $L_R$ is equal to the wall thickness of the static shaft, and axially a distance $L_A$ from the first pitch bearing along the static shaft, thereby minimizing moment loading on the first pitch bearing and the second pitch bearing. The first pitch bearing and the second pitch bearing are disposed radially within a blade root of the rotor blade.

Yet another aspect of the disclosure resides in a wind turbine. The wind turbine including a tower; a hub; at least one rotor blade rotatably connected to the hub and a dual pitch bearing configuration coupling the at least one rotor blade to the hub. The at least one rotor blade rotatable in response to wind impinging upon said at least one rotor blade. The dual pitch bearing configuration including a first pitch bearing and at least one additional pitch bearing. The first pitch bearing including an inner bearing race, an outer bearing race and a plurality of rolling elements disposed between the inner bearing race and the outer bearing race. The at least one additional pitch bearing including an inner bearing race, an outer bearing race and a plurality of rolling elements disposed between the inner bearing race and the outer bearing race. The first pitch bearing is coupled to an interior surface of the static shaft and the at least one additional pitch bearing is coupled to an exterior surface of the static shaft. The at least one additional pitch bearing is disposed radially a distance $L_R$ from the first pitch bearing and axially a distance $L_A$ from the first pitch bearing along the static shaft, thereby minimizing moment loading on the first pitch bearing and the at least one additional pitch bearing.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 5:
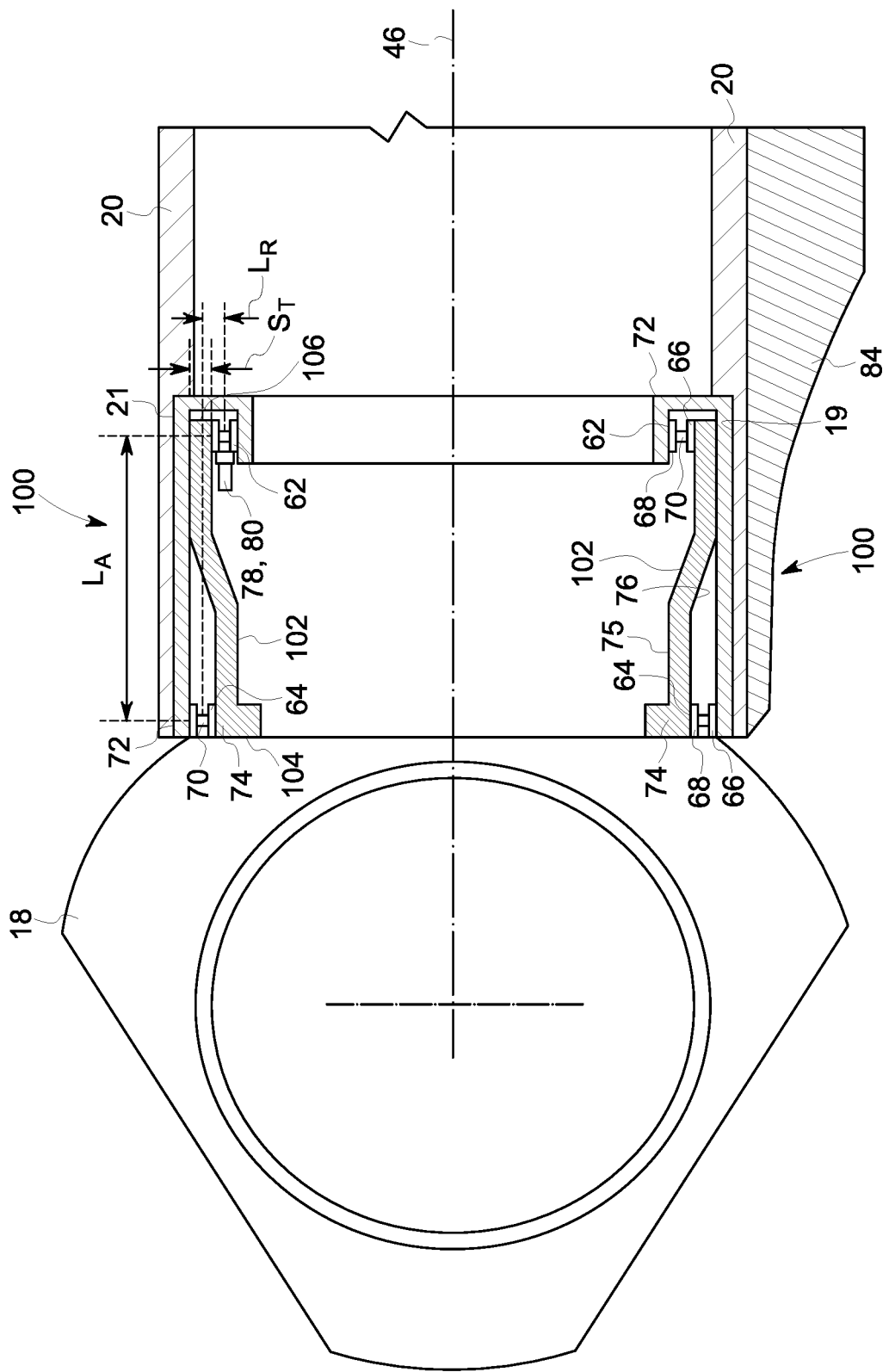
Figure 6:
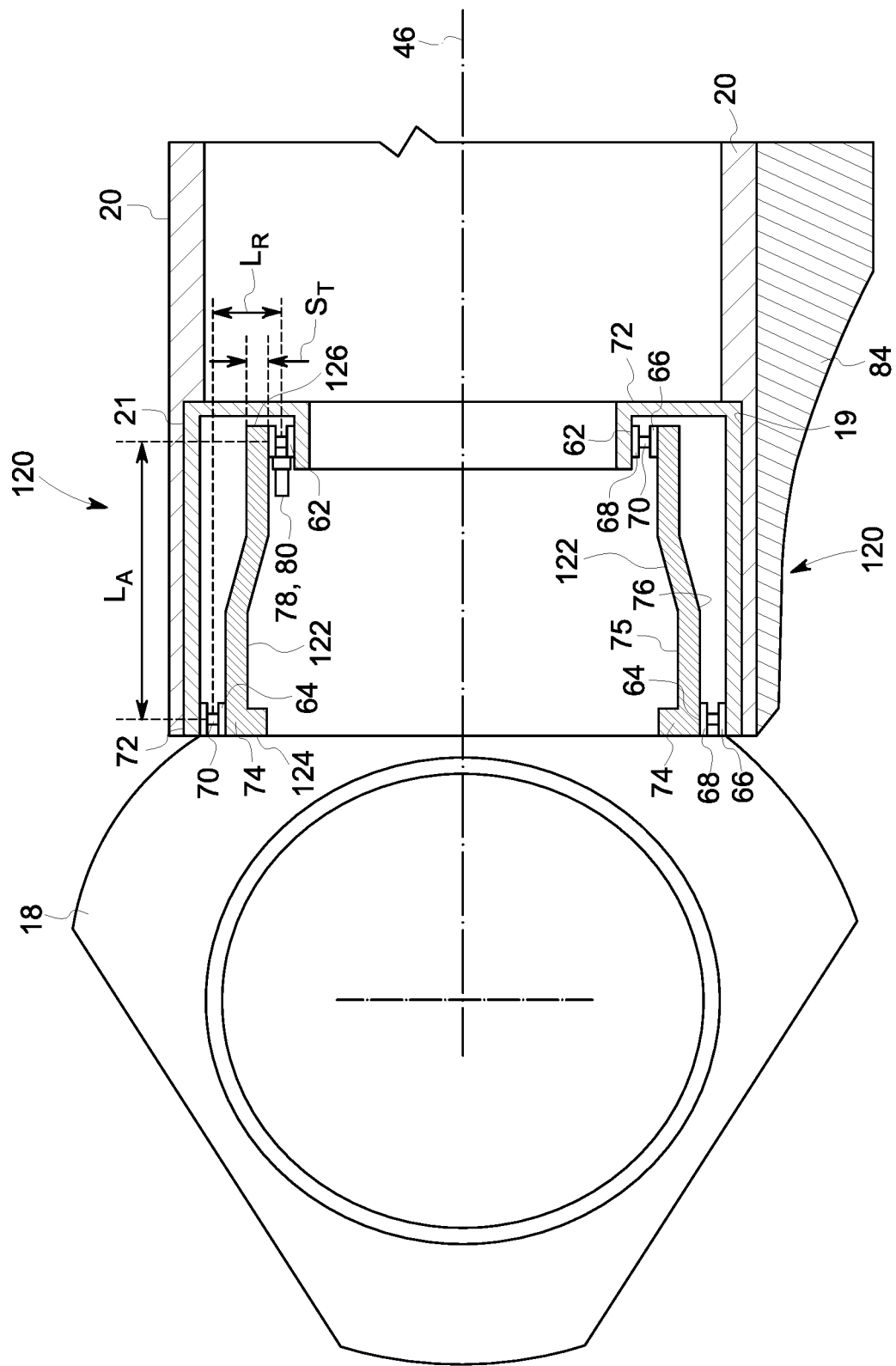

FIG. 5 illustrates a partial cross-sectional view of a portion of the wind turbine according to another embodiment, and more particularly a rotor blade coupled to a wind turbine hub and including a dual pitch bearing configuration, in accordance with one or more embodiments shown or described herein; and FIG. 6 illustrates a partial cross-sectional view of a portion of the wind turbine according to another embodiment, and more particularly a rotor blade coupled to a wind turbine hub and including a dual pitch bearing configuration, in accordance with one or more embodiments shown or described herein.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In general, the present disclosure is directed to bearing configurations for a wind turbine, and more particularly to a dual pitch bearing configuration. In several embodiments, the dual pitch bearing configuration of the wind turbine may include a first pitch bearing and a second pitch bearing, each pitch bearing including a first raceway and a second raceway defined between inner and outer bearing races of the respective bearing. The pitch bearings are configured mounted to opposed surfaces of a static shaft and may be configured such that they are separated radially by a distance $L_R$ and axially by a distance $L_A$, thereby removing a majority of the bending moment applied to the bearings, and transforming substantially the entire load into radial loads. As will be described below, the disclosed bearing configuration(s) including this radial load arrangement may allow the large bending and shear forces that result in the unwanted deflections of the bearing races to be minimized and prevent the ball bearings from becoming stuck in the raceways, thereby decreasing the likelihood of component damage/failure.

It should be appreciated that the disclosed dual pitch bearing configuration(s) have been uniquely configured to handle the dynamic loading of a wind turbine. Specifically, due to erratic moment loading and the fact that each bearing is mounted directly to a relatively flexible rotor blade, the bearings must be equipped to handle axial and radial loads that can vary significantly with time.

It should also be appreciated that, although the present dual pitch bearing configuration will be generally described herein with reference to pitch bearings, the disclosed bearing configurations may be utilized within any suitable wind turbine bearing. For instance, yaw bearings are often subjected to dynamic loading during operation of a wind turbine. Thus, the disclosed bearing configurations may also be implemented within the yaw bearing of a wind turbine to reduce stresses within the bearing.

Figure 1:
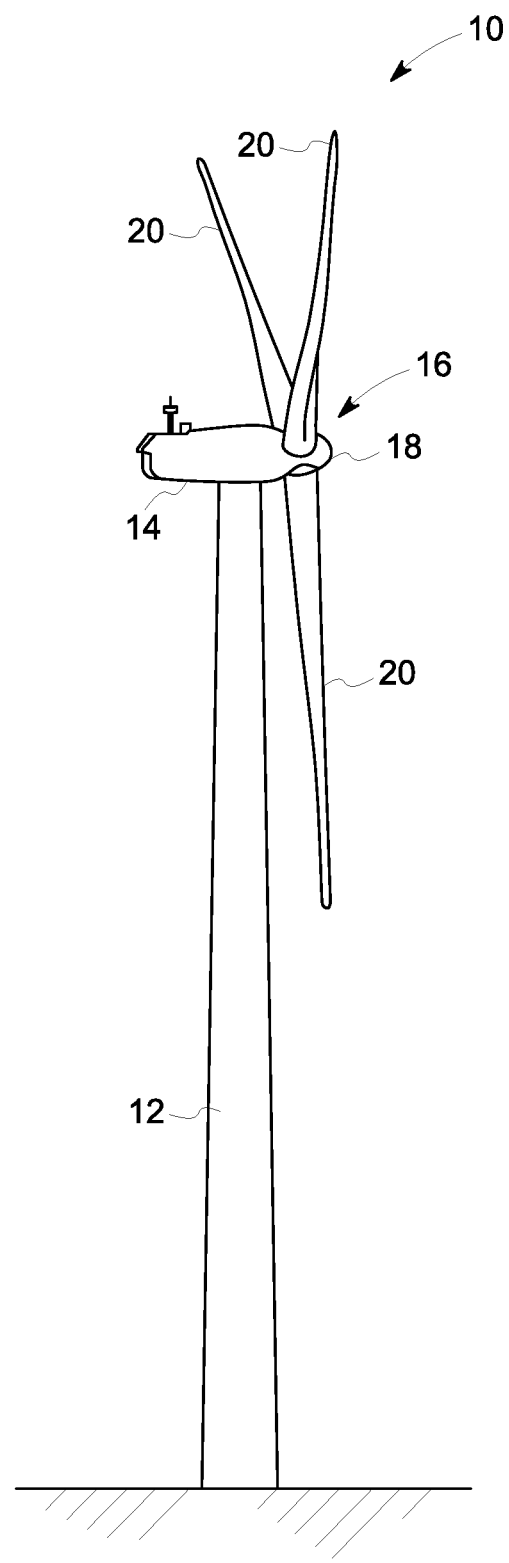
FIG. 1 illustrates a perspective view of one embodiment of a wind turbine, in accordance with one or more embodiments shown or described herein.

Referring now to the drawings, FIG. 1 illustrates a side view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 30 (FIG. 2) positioned within the nacelle 14 to permit electrical energy to be produced.

Figure 2:
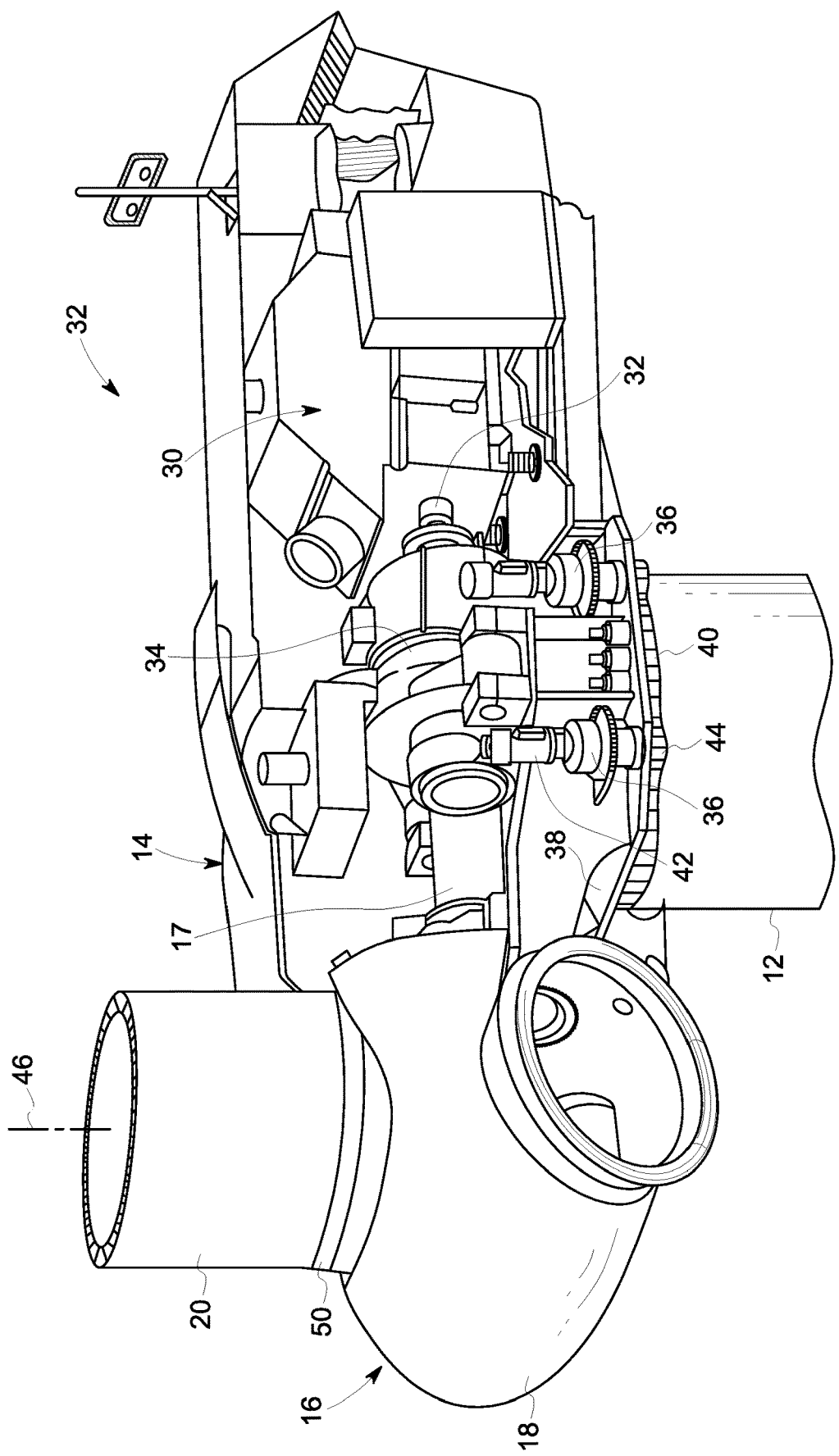
FIG. 2 illustrates a perspective, internal view of the nacelle of the wind turbine shown in FIG. 1, in accordance with one or more embodiments shown or described herein.

Referring now to FIG. 2, a simplified, internal view of one embodiment of the nacelle 14 of the wind turbine 10 shown in FIG. 1 is illustrated. As shown, the generator 30 may be disposed within the nacelle 14. In general, the generator 30 may be coupled to the rotor 16 of the wind turbine 10 for generating electrical power from the rotational energy generated by the rotor 16. For example, the rotor 16 may include a rotor shaft 17 coupled to the hub 18 for rotation therewith.

The generator 30 may then be coupled to the rotor shaft 17 such that rotation of the rotor shaft 17 drives the generator 30. For instance, in the illustrated embodiment, the generator 30 includes a generator shaft 32 rotatably coupled to the rotor shaft 17 through a gearbox 34. However, in other embodiments, it should be appreciated that the generator shaft 32 may be rotatably coupled directly to the rotor shaft 17. Alternatively, the generator 30 may be directly rotatably coupled to the rotor shaft 17 (often referred to as a "direct-drive wind turbine").

Additionally, the wind turbine 10 may include one or more yaw drive mechanisms 36 mounted to and/or through a bedplate 38 positioned atop the wind turbine tower 12. Specifically, each yaw drive mechanism 36 may be mounted to and/or through the bedplate 38 so as to engage a yaw bearing 40 coupled between the bedplate 38 and the tower 12 of the wind turbine 10. The yaw bearing 40 may be mounted to the bed plate 38 such that, as the yaw bearing 40 rotates about a yaw axis (not shown) of the wind turbine 10, the bedplate 38 and, thus, the nacelle 14 are similarly rotated about the yaw axis.

In general, it should be appreciated that the yaw drive mechanisms 36 may have any suitable configuration and may include any suitable components known in the art that allow such mechanisms 36 to function as described herein. For example, as shown in FIG. 2, each yaw drive mechanism 36 may include a yaw motor 42 mounted to the bedplate 38. The yaw motor 42 may be coupled to a yaw gear 44 (e.g., a pinion gear) configured to engage the yaw bearing 40. For instance, the yaw motor 42 may be coupled to the yaw gear 44 directly (e.g., by an output shaft (not shown) extending through the bedplate 38) or indirectly through a suitable gear assembly coupled between the yaw motor 42 and the yaw gear 44. As such, the torque generated by the yaw motor 42 may be transmitted through the yaw gear 44 and applied to the yaw bearing 40 to permit the nacelle 14 to be rotated about the yaw axis of the wind turbine 10. It should be appreciated that, although the illustrated wind turbine 10 is shown as including two yaw drive mechanisms 36, the wind turbine 10 may generally include any suitable number of yaw drive mechanisms 36.

Referring still to FIG. 2, the wind turbine 10 may also include a plurality of pitch bearings (described presently), including thrust bearing technology, and referred to herein as a dual pitch bearing configuration, with each pitch bearing being disposed within a rotor blade 20. As will be described below, each of the dual pitch bearings is configured as a two-point (2-P) contact thrust bearing (described below) and may allow each rotor blade 20 to be rotated about its pitch axis 46 (e.g., via a pitch adjustment mechanism), thereby allowing the orientation of each blade 20 to be adjusted relative to the direction of the wind. Alternatively, the dual pitch bearings may be configured as combination thrust/radial bearings and/or radial bearings.

Figure 3:
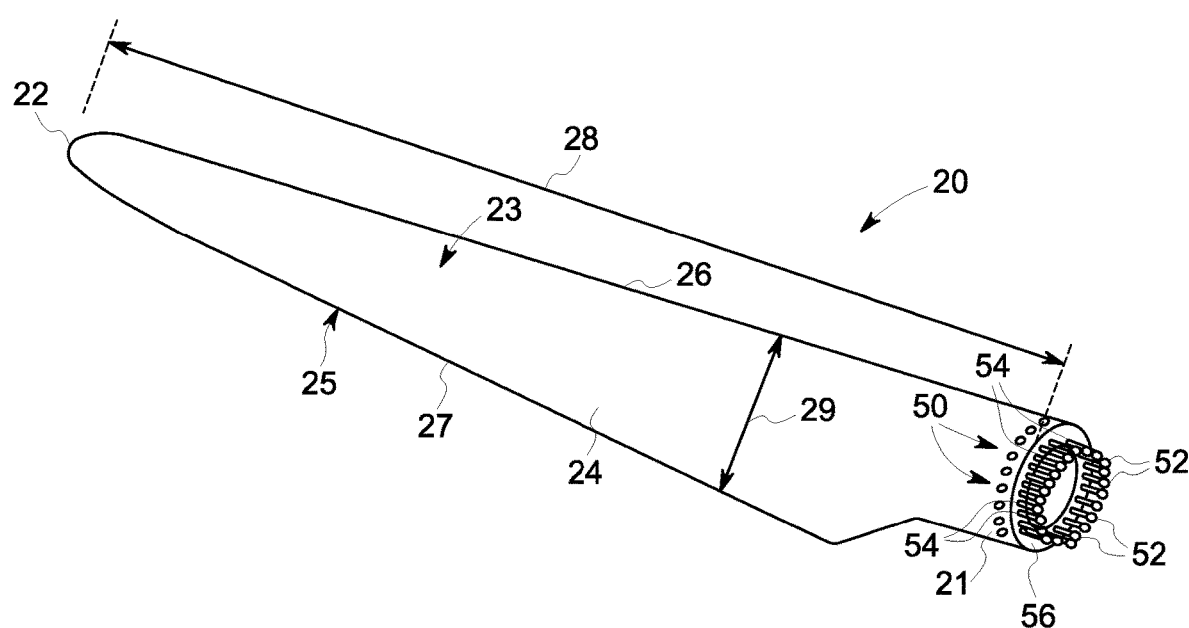
FIG. 3 illustrates a perspective view of one of the rotor blades of the wind turbine shown in FIG. 1, in accordance with one or more embodiments shown or described herein.

Referring now to FIG. 3, a partial cross-sectional view of a portion of the wind turbine shown in FIG. 1, and more particularly a rotor blade 20, coupled to a wind turbine hub 18 including a dual pitch bearing configuration 60, is illustrated in accordance with aspects of the disclosure disclosed herein. A body 23 of the rotor blade 20 may extend lengthwise between the blade root 21 and the blade tip 22 and may generally serve as the outer shell of the rotor blade 20. As is generally understood, the body 23 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles.

Thus, the body 23 may generally include a pressure side 24 and a suction side 25 extending between a leading edge 26 and a trailing edge 27. Additionally, the rotor blade 20 may have a span 28 defining the total length of the body 23 between the blade root 21 and the blade tip 22 and a chord 29 defining the total length of the body 23 between the leading edge 26 and the trailing edge 27. As is generally understood, the chord 29 may vary in length with respect to the span 28 as the body 23 extends from the blade root 21 to the blade tip 22.

Moreover, as shown, the rotor blade 20 may also include a plurality of T-bolts or root attachment assemblies 50 for coupling the blade root 20 to the hub 18 of the wind turbine 10. In general, each root attachment assembly 50 may include a barrel nut 52 mounted within a portion of the blade root 21 and a root bolt 54 coupled to and extending from the barrel nut 52 so as to project outwardly from a root end 56 of the blade root 21. By projecting outwardly from the root end 56, the root bolts 54 may generally be used to couple the blade root 21 to the hub 18 (e.g., via the dual pitch bearings 60), as will be described in greater detail below. Alternatively, the rotor blade 20 may be coupled to a hub extension, or utilize alternative coupling means such as, but not limited to, press fit, wedge, and/or a combinations of known coupling means.

Figure 4:
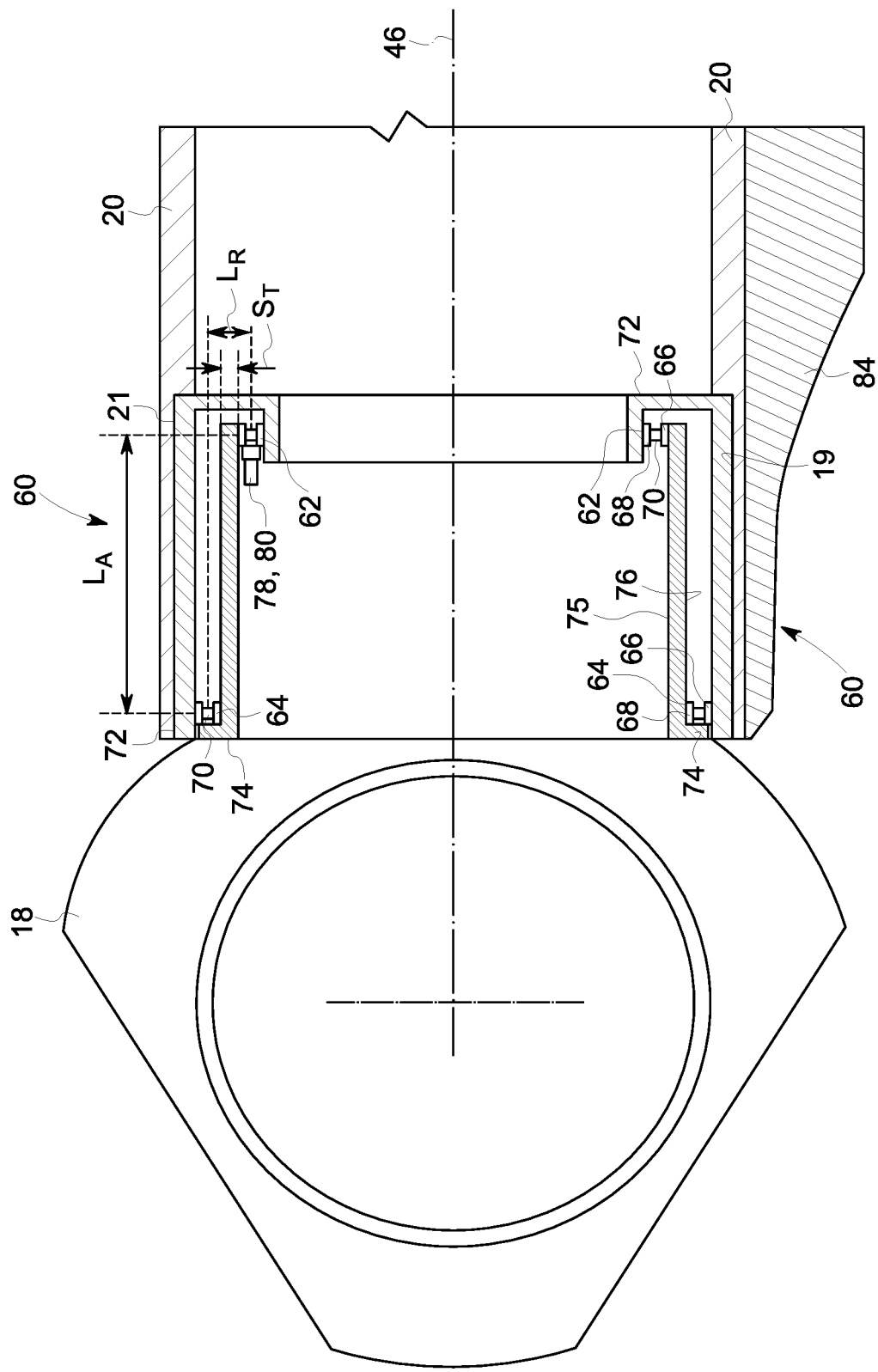
FIG. 4 illustrates a partial cross-sectional view of a portion of the wind turbine shown in FIG. 1, and more particularly a rotor blade coupled to a wind turbine hub and including a dual pitch bearing configuration, in accordance with one or more embodiments shown or described herein.

One or more specific embodiments of the present techniques will be described below. In an effort to provide a concise description of these embodiments, not all features of an actual implementation are described in the specification. Referring more specifically to FIGS. 4-6, illustrated are various embodiments of a dual pitch bearing configuration in relation to a wind turbine blade and hub. For the sake of simplicity, only a portion of the wind turbine 10, and in particular, the rotor blade 20 is shown in FIGS. 4-6. In addition, it should be noted that identical reference numerals denote the same elements throughout the various views.

Referring now to FIG. 4, a partial, cross-sectional view of a portion of the rotor blade 20 shown in FIG. 1 is illustrated, particularly illustrating the rotor blade 20 coupled to the hub 18 via the dual pitch bearing configuration 60 configured in accordance with aspects disclosed herein. As shown, the dual pitch bearing configuration 60 is disposed axially about a central axis 46 and includes a first pitch bearing 62 and at least one additional pitch bearing 64. In this particular embodiment, the pitch bearing configuration 60 includes the first pitch bearing 62 and a second pitch bearing 64. Alternate configuration may include additional pitch bearings. As illustrated the first pitch bearing 62 and the second pitch bearing 64 are disposed on opposed surfaces of a static shaft 74. In this particular embodiment, the static shaft 74 is configured as a substantially straight static shaft. Alternate geometries for the static shaft 74 are anticipated, such as, but not limited to, those described below.

The pitch bearings 62, 64 are configured such that they are separated radially by a distance $L_R$ (from an outer roller center to an inner roller center) and axially by a distance $L_A$ along the static shaft 74, thereby removing a majority of the bending moment applied to the bearings 62, 64, and transforming substantially the entire load into radial loads. In an embodiment, the distance $L_R$ is determined by a wall thickness $S_t$ of the static shaft 74 and the distance $L_A$ is determined by the distance required to reduce the load/moment requirements on the bearings to be within their design capability. In an embodiment, the contact stresses on the ball bearings are lower than or equal to the design stress limit. In an embodiment, $L_R$ is equal to at least 5% of an average diameter of the first pitch bearing 62 and the second pitch bearing 64. In an embodiment, $L_R$ is equal to a combined dimension of $S_t$ and a diameter of the plurality of rolling elements 70 disposed between the inner bearing races 68 and the outer bearing races 66 of the first and second pitch bearings 62, 64. In an embodiment, $L_A$ is at least 8% of the total blade length, or at least 0.5 m.

Each of the pitch bearings 62, 64 includes an outer bearing race 66, an inner bearing race 68, defining a plurality of raceway grooves (not shown), and a plurality of rolling elements 70 disposed between the outer and inner bearing races 66, 68. As previously indicated, the first pitch bearing 62 and the second pitch bearing 64 are disposed on opposed surfaces of the static shaft 74. Accordingly, in an embodiment, the outer bearing race 66 of the first pitch bearing 62 and the inner bearing race 68 of the second pitch bearing 64 may be configured to be mounted to opposed surfaces, and more specifically an interior surface 75 of the static shaft 74 and an exterior surface 76 of the static shaft 74, respectively, using any suitable fastening mechanisms. Furthermore, in the embodiment of FIG. 4, the inner bearing race 68 of the first pitch bearing 62 and the outer bearing race 66 of the second pitch bearing 64 may generally be configured to be mounted to a bearing sleeve 72 via suitable fastening mechanisms. The bearing sleeve 72 may generally be configured to be mounted to an interior surface 19 of the blade 20, and more particularly, the blade root 21. For example, as shown in FIG. 4, the outer bearing race 66 of the first pitch bearing 62 may be coupled to the interior surface 75 of the static shaft 74 and the inner bearing race 68 of the second pitch bearing 64 may be coupled to the exterior surface 76 of the static shaft 74 utilizing known coupling means such as, but not limited to, press fit, wedge, and/or a combination of known coupling means.

As previously alluded to, the first pitch bearing 62 and the second pitch bearing 64 are disposed on the opposed interior and exterior surfaces 75, 76 of the static shaft 74 and separated radially by a distance $L_R$ and axially by a distance $L_A$, thereby removing a majority of the bending moment applied to the bearings 62, 64, and transforming substantially the entire load into one or more radial loads. More particularly, the inclusion of the pitch bearings 62, 64 enables the reduction of forces and moments at the bearing location, as well as reduction of blade tip deflections. In an embodiment, the first pitch bearing 62 and the second pitch bearing 64 may be configured as thrust bearings, thrust/radial bearings, and/or radial bearings. In a more specific embodiment, the first pitch bearing 62 is a radial bearing and the second pitch bearing 64 is a radial/thrust bearing. Alternate configurations for the pitch bearings 62, 64 are anticipated.

As is generally understood, in this particular embodiment, the inner bearing race 68 of the first pitch bearing 62 may be configured to be rotated relative to the outer bearing race 66 (via the rolling elements 70). Similarly, the outer bearing race 66 of the second pitch bearing 64 may be configured to be rotated relative to the inner bearing race 68 (via the rolling elements 70). Such rotation of the first pitch bearing 62 and the second pitch bearing 64 allows the pitch angle of each rotor blade 20 to be adjusted. As shown in FIG. 4, such relative rotation of the outer and inner bearing races 66, 68 may be achieved using a pitch adjustment mechanism 78, mounted to the static shaft 74 or proximate thereto. In general, the pitch adjustment mechanism 78 may include any suitable components and may have any suitable configuration that allows the mechanism 78 to function as described herein. For example, as shown in the illustrated embodiment, the pitch adjustment mechanism 78 may include a pitch drive motor 80 (e.g., an electric motor), a pitch drive gearbox (not shown), and a pitch drive pinion (not shown). In such an embodiment, the pitch drive motor 80 may be coupled to the pitch drive gearbox so that the motor 80 imparts mechanical force to the gearbox. Similarly, the gearbox may be coupled to the pitch drive pinion for rotation therewith. The pinion may, in turn, be in rotational engagement with the outer bearing race 66 to result in rotation of the outer bearing race 66 relative to the inner bearing race 68 and, thus, rotation of the rotor blade 20 relative to the hub 18.

In this particular embodiment, the dual pitch bearing configuration 60 is radially housed within the blade root end of the blade 20. As illustrated, the blade 20 further includes a fairing 84 that may provide a reduction in drag, noise, and/or smoothing of the airflow.

Referring now to FIG. 5, a partial cross-sectional view of another embodiment of a portion of a wind turbine, generally similar to wind turbine 10 of FIG. 1, is illustrated. According to this embodiment, illustrated is a rotor blade coupled to a wind turbine hub and including a dual pitch bearing configuration. As previously indicated, identical reference numerals denote the same elements throughout the various views. More particularly, illustrated is the rotor blade 20 coupled to the hub 18 via a dual pitch bearing configuration 100 configured in accordance with aspects disclosed herein. As shown, the dual pitch bearing configuration 100 is disposed axially about a central axis 46 and includes a first pitch bearing 62 and at least one additional pitch bearing 64. In this particular embodiment, the pitch bearing configuration 100 includes the first pitch bearing 62 and a second pitch bearing 64 disposed on opposed surfaces of a static shaft 74. In this particular embodiment, and in contrast to the embodiment of FIG. 4, the static shaft 74 is configured as a radially outward offset static shaft 102, whereby the radially outward offset static shaft 102 is offset from a first end 104 to a second end 106 in a radially outwardly direction relative to the pitch axis 46, moving axially from the hub 18 to the blade 20. The pitch bearings 62, 64 are configured such that they are separated radially by a distance $L_R$ and axially by a distance $L_A$, along the radially outward offset static shaft 102, similar to the previous embodiment to remove a majority of the bending moment applied to the bearings 62, 64, and transform substantially the entire load into one or more radial loads. Each of the pitch bearings 62, 64 includes an outer bearing race 66, an inner bearing race 68, defining a plurality of raceway grooves (not shown), and a plurality of rolling elements 70 disposed between the outer and inner bearing races 66, 68.

Similar to the previous embodiment, in the embodiment illustrated in FIG. 5, the pitch bearings 62, 64 are disposed on opposed surfaces of the static shaft 74, and more particularly the radially outward offset static shaft 102. More particularly, the outer bearing race 66 of the first pitch bearing 62 and the inner bearing race 68 of the second pitch bearing 64 may be configured to be mounted to opposed surfaces, and more specifically an interior surface 75 and an exterior surface 76, respectively, of the radially outward offset static shaft 102 using any suitable fastening mechanisms. For example, as shown in FIG. 5, the outer bearing race 66 of the first pitch bearing 62 may be coupled to the interior surface 75 of the radially outward offset static shaft 102 and the inner bearing race 68 of the second pitch bearing 64 may be coupled to the exterior surface 76 of the radially outward offset static shaft 102 utilizing known coupling means such as, but not limited to, press fit, wedge, and/or a combination of known coupling means. Furthermore, in the embodiment of FIG. 5, the inner bearing race 68 of the first pitch bearing 62 and the outer bearing race 66 of the second pitch bearing 64 may generally be configured to be mounted to a bearing sleeve 72 via suitable fastening mechanisms. The bearing sleeve 72 may generally be configured to be mounted to an interior surface 19 of the blade 20, and more particularly, the blade root 21.

As previously described, the first pitch bearing 62 and the second pitch bearing 64 are disposed on the opposed surfaces 75, 76 of the radially outward offset static shaft 102 and separated radially by a distance $L_R$ and axially by a distance $L_A$, thereby removing a majority of the bending moment applied to the bearings 62, 64, and transforming substantially the entire load into one or more radial loads. More particularly, the inclusion of the pitch bearings 62, 64 enables the reduction of forces and moments at the bearing location, as well as reduction of blade tip deflections. In an embodiment, the first pitch bearing 62 and the second pitch bearing 64 may be configured as thrust bearings, thrust/radial bearings, and/or radial bearings. In a more specific embodiment, the first pitch bearing 62 is a radial bearing and the second pitch bearing 64 is a radial/thrust bearing. Alternate configurations for the pitch bearings 62, 64 are anticipated.

As is generally understood, in this particular embodiment, the inner bearing race 68 of the first pitch bearing 62 may be configured to be rotated relative to the outer bearing race 66 (via the rolling elements 70). Similarly, the outer bearing race 66 of the second pitch bearing 64 may be configured to be rotated relative to the inner bearing race 68 (via the rolling elements 70). Such rotation of the first pitch bearing 62 and the second pitch bearing 64 allows the pitch angle of each rotor blade 20 to be adjusted. As shown in FIG. 5, such relative rotation of the outer and inner bearing races 66, 68 may be achieved using a pitch adjustment mechanism 78, mounted relative to the bearing races 62, 64. In general, the pitch adjustment mechanism 78 may include any suitable components and may have any suitable configuration that allows the mechanism 78 to function as described herein. For example, similar to the previously described embodiment, the pitch adjustment mechanism 78 may include a pitch drive motor 80 (e.g., an electric motor), a pitch drive gearbox (not shown), and a pitch drive pinion (not shown). In such an embodiment, the pitch drive motor 80 may be coupled to the pitch drive gearbox so that the motor 80 imparts mechanical force to the gearbox. Similarly, the gearbox may be coupled to the pitch drive pinion for rotation therewith. The pinion may, in turn, be in rotational engagement with the inner bearing race 68 to result in rotation of the inner bearing race 68 relative to the outer bearing race 66 and, thus, rotation of the rotor blade 20 relative to the hub 18.

Referring now to FIG. 6, a partial cross-sectional view of another embodiment of a portion of a wind turbine, generally similar to wind turbine 10 of FIG. 1, is illustrated. More particularly, illustrated is a rotor blade coupled to a wind turbine hub and including a dual pitch bearing configuration. As previously indicated, identical reference numerals denote the same elements throughout the various views. Illustrated in FIG. 6 is the rotor blade 20 coupled to the hub 18 via a dual pitch bearing configuration 120 configured in accordance with aspects disclosed herein. As shown, the dual pitch bearing configuration 120 is disposed axially about a central axis 46 and includes a first pitch bearing 62 and at least one additional pitch bearing 64. In this particular embodiment, the pitch bearing configuration 120 includes the first pitch bearing 62 and a second pitch bearing 64 disposed on opposed surfaces of a static shaft 74. In this particular embodiment, and in contrast to the embodiment of FIG. 5, the static shaft 74 is configured as a radially inward offset static shaft 122, whereby the radially inward offset static shaft 122 is offset from a first end 104 to a second end 106 in a radially outwardly direction relative to the pitch axis 46, moving axially from the hub 18 to the blade 20. The pitch bearings 62, 64 are configured such that they are separated radially by a distance $L_R$ and axially by a distance $L_A$, along the radially inward offset static shaft 122, similar to the previous embodiment to remove a majority of the bending moment applied to the bearings 62, 64, and transform substantially the entire load into one or more radial loads. Each of the pitch bearings 62, 64 includes an outer bearing race 66, an inner bearing race 68, defining a plurality of raceway grooves (not shown), and a plurality of rolling elements 70 disposed between the outer and inner bearing races 66, 68.

Similar to the previous embodiments, in the embodiment illustrated in FIG. 6, the pitch bearings 62, 64 are disposed on opposed surfaces of the static shaft 74, and more particularly the radially inward offset static shaft 122. More particularly, the outer bearing race 66 of the first pitch bearing 62 and the inner bearing race 68 of the second pitch bearing 64 may be configured to be mounted to opposed surfaces, and more specifically an interior surface 75 and an exterior surface 76, respectively, of the radially inward offset static shaft 122 using any suitable fastening mechanisms. As illustrated in FIG. 6, the outer bearing race 66 of the first pitch bearing 62 may be coupled to the interior surface 75 of the radially inward offset static shaft 122 and the inner bearing race 68 of the second pitch bearing 64 may be coupled to the exterior surface 76 of the radially inward offset static shaft 122 utilizing known coupling means such as, but not limited to, press fit, wedge, and/or a combination of known coupling means. Furthermore, in the embodiment of FIG. 6, the inner bearing race 68 of the first pitch bearing 62 and the outer bearing race 66 of the second pitch bearing 64 may generally be configured to be mounted to a bearing sleeve 72 via suitable fastening mechanisms. The bearing sleeve 72 may generally be configured to be mounted to an interior surface 19 of the blade 20, and more particularly, the blade root 21.

As previously described, the first pitch bearing 62 and the second pitch bearing 64 are disposed on the opposed surfaces 75, 76 of the radially inward offset static shaft 122 and separated radially by a distance $L_R$ and axially by a distance $L_A$, thereby removing a majority of the bending moment applied to the bearings 62, 64, and transforming substantially the entire load into one or more radial loads. More particularly, the inclusion of the pitch bearings 62, 64 enables the reduction of forces and moments at the bearing location, as well as reduction of blade tip deflections. In an embodiment, the first pitch bearing 62 and the second pitch bearing 64 may be configured as thrust bearings, thrust/radial bearings, and/or radial bearings. In a more specific embodiment, the first pitch bearing 62 is a radial bearing and the second pitch bearing 64 is a radial/thrust bearing. Alternate configurations for the pitch bearings 62, 64 are anticipated.

As previously described, the inner bearing race 68 of the first pitch bearing 62 may be configured to be rotated relative to the outer bearing race 66 (via the rolling elements 70). Similarly, the outer bearing race 66 of the second pitch bearing 64 may be configured to be rotated relative to the inner bearing race 68 (via the rolling elements 70). Such rotation of the first pitch bearing 62 and the second pitch bearing 64 allows the pitch angle of each rotor blade 20 to be adjusted. As shown in FIG. 6, such relative rotation of the outer and inner bearing races 66, 68 may be achieved using a pitch adjustment mechanism 78, mounted relative to the bearing races 62, 64. In general, the pitch adjustment mechanism 78 may include any suitable components and may have any suitable configuration that allows the mechanism 78 to function as described herein. For example, similar to the previously described embodiment, the pitch adjustment mechanism 78 may include a pitch drive motor 80 (e.g., an electric motor), a pitch drive gearbox (not shown), and a pitch drive pinion (not shown). In such an embodiment, the pitch drive motor 80 may be coupled to the pitch drive gearbox so that the motor 80 imparts mechanical force to the gearbox. Similarly, the gearbox may be coupled to the pitch drive pinion for rotation therewith. The pinion may, in turn, be in rotational engagement with the inner bearing race 68 to result in rotation of the inner bearing race 68 relative to the outer bearing race 66 and, thus, rotation of the rotor blade 20 relative to the hub 18.

By providing a radial offset, or radial distance, $L_R$ between the first pitch bearing and the second pitch bearing and by increasing the axial distance $L_A$ between the two bearing rows, and more particularly, the first pitch bearing and the second pitch bearing, the forces required by the bearings to resist the moment imposed by the overhung blade mass is reduced significantly. As $L_A$ approaches zero, the resultant forces on the pitch bearing rolling elements become more oriented in the axial direction (rotational blade axis). This scenario causes truncation, rolling element bunching, and less uniform contact area between the rolling elements and the internal bearing casing surfaces. The above challenges can be minimized by disposing the two bearing rows on opposed surfaces of the static shaft so as to be separated by a radial distance $L_R$ and increasing the axial distance $L_A$ between the two pitch bearings, thus the reaction forces on the rolling elements becoming more radial.

It should be appreciated that the dual pitch bearing configuration(s) shown in FIGS. 4-6 may be utilized with any other suitable wind turbine bearing(s). For instance, in several embodiments, the bearing configuration(s) may be utilized within the yaw bearing 40 (FIG. 2) of the wind turbine 10 (FIG. 1). For instance, in several embodiments, the yaw bearing 40 may include a dual bearing configuration, each bearing including an inner bearing race and an outer bearing race rotatable relative to the inner bearing race, with one or more rows of rolling elements being disposed between the respective inner and outer bearing races, and wherein the bearing are separated by a separated by a radial distance $L_R$ and an axial distance $L_A$. In such embodiments, the yaw bearing 40 may be configured to adjust the orientation of the nacelle 14 (FIG. 1) relative to the direction of the wind.

Accordingly, disclosed is a dual pitch bearing configuration incorporating thrust bearing technology that solves many issues in current bearing designs. The dual pitch bearing configuration disclosed herein offers several advantages over existing pitch bearing designs, including, but not limited to: i) the reduction of forces and moments at the bearing location, as well as reduction of blade tip deflections; ii) minimization of the potato chip effect on the race bearing helping prevent ball bearings from becoming stuck in the race; iii) ability to handle larger diameter rotors; iv) higher reliability; and v) cost saving.

It is to be understood that not necessarily all such objects or advantages described above may be achieved in accordance with any particular embodiment. Thus, for example, those skilled in the art will recognize that the disclosed embodiments and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, various features described, as well as other known equivalents for each feature, may be mixed and matched by one of ordinary skill in this art to construct additional embodiments and techniques in accordance with principles of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dual pitch bearing configuration for a rotor blade of a wind turbine, the dual pitch bearing configuration comprising:
   a first pitch bearing including an inner bearing race, an outer bearing race and a plurality of rolling elements disposed between the inner bearing race and the outer bearing race;
   at least one additional pitch bearing including an inner bearing race, an outer bearing race and a plurality of rolling elements disposed between the inner bearing race and the outer bearing race,
   wherein the first pitch bearing and the at least one additional pitch bearing are coupled to opposed surfaces of a static shaft,
   wherein the inner bearing race of the first pitch bearing and the outer bearing race of the at least one additional pitch bearing are coupled to a bearing sleeve disposed in the rotor blade and rotatable with the rotor blade, and
   wherein the at least one additional pitch bearing is disposed radially a distance $L_R$ from the first pitch bearing and axially a distance $L_A$ from the first pitch bearing along the static shaft, thereby minimizing moment loading on the first pitch bearing and the at least one additional pitch bearing.

2. The dual pitch bearing configuration of claim 1, wherein the at least one additional pitch bearing comprises a second pitch bearing disposed radially by a distance $L_R$ from the first pitch bearing and axially a distance $L_A$ from the first pitch bearing.

3. The dual pitch bearing configuration of claim 1, wherein the distance $L_R$ is equal to at least 5% of an average diameter of the first pitch bearing and the at least one additional pitch bearing.

4. The dual pitch bearing configuration of claim 1, wherein the static shaft is one of straight shaft, a radially inward offset static shaft and a radially outward offset static shaft.

5. The dual pitch bearing configuration of claim 1, wherein the static shaft includes a first end and a second end, and where the first end is radially offset from the second end.

6. The dual pitch bearing configuration of claim 1, wherein the outer bearing race of the first pitch bearing is coupled to an interior surface of the static shaft and the inner bearing race of the at least one additional pitch bearing is coupled to an exterior surface of the static shaft.

7. The dual pitch bearing configuration of claim 1, wherein the first pitch bearing is a radial pitch bearing and the at least one additional pitch bearing is a thrust pitch bearing.

8. The dual pitch bearing configuration of claim 1, wherein the rotor blade is rotatably coupled to a hub of the wind turbine and wherein the first pitch bearing and the at least one additional pitch bearing are disposed within the rotor blade.

9. A dual pitch bearing configuration for coupling a rotor blade to a hub of a wind turbine, the dual pitch bearing configuration comprising:
   a static shaft including a wall thickness defining an interior surface and an exterior surface, the static shaft extending axially from the hub;
   a first pitch bearing coupled to the interior surface of the static shaft, the first pitch bearing including an inner bearing race, an outer bearing race and a plurality of rolling elements disposed between the inner bearing race and the outer bearing race;
   a second pitch bearing coupled to the exterior surface of the static shaft, the second pitch bearing including an inner bearing race, an outer bearing race and a plurality of rolling elements disposed between the inner bearing race and the outer bearing race, the second pitch bearing disposed radially a distance $L_R$ from the first pitch bearing, where $L_R$ is equal to the wall thickness of the static shaft, and axially a distance $L_A$ from the first pitch bearing along the static shaft, thereby minimizing moment loading on the first pitch bearing and the second pitch bearing; and
   the first pitch bearing and the second pitch bearing disposed within a blade root of the rotor blade.

10. The dual pitch bearing configuration of claim 9, wherein the outer bearing race of the first pitch bearing and the inner bearing race of the second pitch bearing are coupled to the static shaft and the inner bearing race of the first pitch bearing and the outer bearing race of the second pitch bearing are coupled to a bearing sleeve configured rotatable with the rotor blade.

11. The dual pitch bearing configuration of claim 9, wherein the static shaft is one of straight shaft, a radially inward offset static shaft and a radially outward offset static shaft.

12. The dual pitch bearing configuration of claim 9, wherein the static shaft includes a first end and a second end, and where the first end is radially offset from the second end.

13. The dual pitch bearing configuration of claim 9, wherein the first pitch bearing is a radial pitch bearing and the at least one additional pitch bearing is a thrust pitch bearing.

14. A wind turbine comprising:
   a tower;
   a hub;
   at least one rotor blade rotatably connected to the hub, the at least one rotor blade rotatable in response to wind impinging upon said at least one rotor blade; and
   a dual pitch bearing configuration coupling the at least one rotor blade to the hub, the dual pitch bearing configuration comprising:
      a first pitch bearing including an inner bearing race, an outer bearing race and a plurality of rolling elements disposed between the inner bearing race and the outer bearing race; and
      at least one additional pitch bearing including an inner bearing race, an outer bearing race and a plurality of rolling elements disposed between the inner bearing race and the outer bearing race,
      wherein the first pitch bearing is coupled to an interior surface of a static shaft and the at least one additional pitch bearing is coupled to an exterior surface of the static shaft,
      wherein the inner bearing race of the first pitch bearing and the outer bearing race of the at least one additional pitch bearing are coupled to a bearing sleeve disposed in the at least one rotor blade rotor blade and rotatable with the at least one rotor blade rotor blade, and
      wherein the at least one additional pitch bearing is disposed radially a distance $L_R$ from the first pitch bearing and axially a distance $L_A$ from the first pitch bearing along the static shaft, thereby minimizing moment loading on the first pitch bearing and the at least one additional pitch bearing.

15. The wind turbine of claim 14, wherein the at least one additional pitch bearing comprises a second pitch bearing disposed radially by a distance $L_R$ from the first pitch bearing and axially a distance $L_A$ from the first pitch bearing along the static shaft.

16. The wind turbine of claim 14, wherein the static shaft has a defined shaft wall thickness $S_t$ and wherein the distance $L_R$ is equal to the shaft wall thickness $S_t$ and a diameter of the plurality of rolling elements disposed between the inner bearing races and the outer bearing races of the first pitch bearing and the at least one additional pitch bearing.

17. The wind turbine of claim 14, wherein the static shaft is one of straight shaft, a radially inward offset static shaft and a radially outward offset static shaft.

18. The wind turbine of claim 14, wherein the static shaft includes a first end and a second end, and where the first end is radially offset from the second end.

19. The wind turbine of claim 14, wherein the outer bearing race of the first pitch bearing is coupled to the interior surface of the static shaft and the inner bearing race of the at least one additional pitch bearing is coupled to the exterior surface of the static shaft.

20. The wind turbine of claim 14, wherein the first pitch bearing is a radial pitch bearing and the at least one additional pitch bearing is a thrust pitch bearing.

21. The wind turbine of claim 14, wherein the at least one rotor blade is rotatably coupled to the hub of the wind turbine and wherein the first pitch bearing and the at least one additional pitch bearing are disposed within the at least one rotor blade.

* * * * *